United States Patent

Weigand

[11] 3,764,893
[45] Oct. 9, 1973

[54] METHOD FOR TESTING STORAGE BATTERIES FOR INTERNAL LEAKAGE USING A CHEMICALLY TREATED TEST STRIP

[76] Inventor: Warren E. Weigand, 1676 Alhambra Ln., Oakland, Calif. 94611

[22] Filed: Nov. 10, 1971

[21] Appl. No.: 197,399

[52] U.S. Cl. ............... 324/29.5, 136/182, 340/249
[51] Int. Cl. ........................................... G01n 27/42
[58] Field of Search .................. 324/29.5; 136/182; 320/48; 340/249

[56] References Cited
UNITED STATES PATENTS
1,497,388  6/1924  Sterling ...................... 324/29.5 X
3,046,786  7/1962  Tessem ...................... 136/182 X Primary Examiner—Robert J. Corcoran
Attorney—Joseph B. Gardner

[57] ABSTRACT

A device for and method of testing the available potential energy or operational capability of an electric storage battery; and a method of making the testing device which comprises a strip of paper having sufficient length to extend between and firmly engage the positive and negative terminals of a battery. The strip is impregnated with an indicator substance such as phenolphthalein responsive to the presence of a basic solution to provide color indicia representative of the concentration thereof and it is further impregnated with an electrolytic solution effective when electrolyzed to produce the basic solution to which the indicator substance is responsive. The method of preparing the test strip includes the steps of impregnating the same with both the indicator substance and electrolyte; and the method of testing a battery to determine its available potential energy includes: first, the step of pressing the strip against the negative terminal of the battery; and second, the step of pressing the strip against each of the terminals of the battery to effect a current flow through the electrolytic solution carried by the strip. After each such step the strip is inspected to observe any color change about the area of the strip in engagement with the negative terminal. A color change after the first test step is an index of a defective battery occasioned by internal current leakage, and the aggregate intensity or concentration of any such color is an index of the magnitude of the leakage. A color change after the second test step establishes that the battery has available potential energy, and the intensity or concentration of the color change is an index of the magnitude of the potential energy then available.

3 Claims, 11 Drawing Figures

PATENTED OCT 9 1973　　　　　　　　　　　　3,764,893

INVENTOR:
WARREN EDWARD WEIGAND
BY: Joseph B. Gardner
ATTORNEY

METHOD FOR TESTING STORAGE BATTERIES FOR INTERNAL LEAKAGE USING A CHEMICALLY TREATED TEST STRIP

RELATED DISCLOSURE

The invention disclosed in this application is explained in U.S. Pat. Disclosure Document No. 005,365, filed May 26, 1971 in the United States Patent Office.

This invention relates to the art of testing electric storage batteries and, more particularly, to a method of evaluating the operational capability or potential energy of an electric storage battery, to a test device for use in evaluating the operational capability and potential energy of a storage battery, and to a method of preparing such test device. The invention has utility with substantially all electric storage batteries including both dry cells and wet cells, but is especially suited for use with relatively small dry cell batteries.

The prevalance today of battery operated electronic equipment including portable radios, record players, and portable television sets and of battery operated toys of all varieties for children of various ages has resulted in a massive production and sale of batteries for use in such equipment and devices. Further, the replacement market for such batteries is most extensive because of the rate at which the batteries are used by those having equipment and devices of the types noted. This massive market is serviced by a substantial number of manufacturers both domestic and foreign, and by retail outlets of all types including grocery stores, drug stores, toy stores, etc. At present, purchasers of these electric storage batteries have no way of testing the same to determine the quality thereof, and the consumer has no choice but to assume that each battery purchased fulfills the quality standards intended therefore.

However, in tests that have been made it has been found that a very substantial number of such batteries are at least partially defective at the time of their purchase in the sense that they do not have the operational capability or potential energy intended to be provided thereby. This deficiency in such batteries may be attributable to a variety of causes including deficiencies in the manufacturing process that causes the batteries to have internal leakage so that they are continuously discharging, faults in the storage or packaging of the batteries which causes the same to discharge because of unwanted and unintended external loads being applied thereto, and combinations of these factors. In any case, and whatever the reason, a substantial number of batteries are defective when purchased, and the purchaser has no way of ascertaining this deficiency at or prior to the time of the purchase.

In view of the foregoing, an object of the present invention is to provide an arrangement for quickly and easily determining the operational capability or potential energy of an electric storage battery without the requirement of expensive and complex electronic test equipment such as the usual test meter which measures the current output of a battery by connecting a resistance of predetermined value across the terminals thereof and determining the ampere flow through the resistance.

Another object of the invention is that of providing a test arrangement of the character described which uses a test strip that is inexpensive to supply, that is readily used and requires neither special tools and equipment or technical knowledge of any sort, and gives a positive indication of the operational capability of the battery being tested.

Still another object is in the provision of a test arrangement of the type set forth that includes a test strip, a method of preparing the same, and a method of testing a storage battery for internal leakage, for the contemporary magnitude of the available potential energy, and for both of these factors.

Additional objects and advantages of the invention, especially as concerns particular features and characteristics thereof, will become apparent as the specification continues.

In general summary terms, the invention contemplates the use of a test strip constituting a length of material sufficiently long to extend between and firmly engage the positive and negative terminals of a battery to be tested. The test strip is impregnated with an indicating substance responsive to the presence of a predetermined chemical condition to provide a color intensity generally proportional to the magnitude of such condition, and it is further impregnated with an electrolytic solution effective when electrolyzed to produce the chemical condition to which the indicator substance is responsive. Each test strip is prepared by first impregnating the same with a solution of the indicator substance, then drying the strip, and then impregnating the strip with an electrolytic solution. The prepared strip may then be dried and thereafter wetted with water at the time of use, or it can be packaged in a liquid-tight packet when in a wet condition so that it is immediately ready for use when the packet is opened.

In performing the testing method by use of the test strip, it is first held in firm engagement with the negative terminal of a storage battery for a short period (e.g., approximately 1 minute) to note whether a color change has occurred throughout the area of the strip held in engagement with the terminal, any color change being indicative of an internal current flow in the battery and a consequent defect therein. The strip is next pressed into firm engagement concurrently with both the negative and positive terminals of the battery and held in contact therewith for approximately the same time period, and the color intensity of the strip observed at the area thereof in engagement with the negative terminal. The magnitude of the color intensity after such test is in general proportion to the magnitude of the potential energy then contained by the battery and available for use.

An embodiment of the invention is illustrated in the accompanying drawing, in which.

Test strips embodying the present invention may be prepared individually or, in more practicable terms, in larger quantities so as to simplify and facilitate preparation and thereby reduce the cost of each test strip. The preparation procedure illustrated in FIGS. 1 through 5 embodies the more desirable larger-quantity preparation, and utilizes as one of the starting materials a relatively large web 15 which may have any suitably convenient size and is adapted to be subdivided into a plurality of smaller discrete test strips.

The web 15 may be formed from a variety of materials adapted to be impregnated with an indicator substance responsive to the presence of a predetermined chemical condition to provide visual indicia of the presence of such condition. A material that is generally ideal for purposes hereof is paper although other fabrics such as cloth formed from either natural or synthetic fibres may be used. Paper, it will be appreciated, is relatively inexpensive and it also provides other characteristics that are advantageous. In this respect, the web 15 used should be chemically neutral so that it does not have inherent properties which could adversely influence the outcome of the tests to be made therewith, as described hereinafter, or which would have to be considered as one of the active factors in evaluating the test results. For purposes of specificity, the web 15 may be taken to be a chemically neutral paper.

Figure 1:
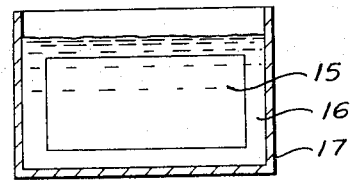
FIG. 1 is a diagrammatic view illustrating the step of impregnating a web of material with an indicator substance by immersing the web in a solution thereof.

The web 15 can be impregnated with the indicator substance by means of a variety of procedures, and in the specific embodiment being considered the web 15 is immersed in a liquid solution of the indicator. In FIG. 1, the body of indicator solution is denoted generally with the numeral 16, and it is confined within a container 17. The impregnation procedure depicted in FIG. 1 is a batch-type operation in which one or more webs 15 are immersed within the solution 16 and are then removed therefrom. It will be understood, however, that a continuous process can be employed in which a continuous web is passed through the solution at a rate which will produce the desired degree of impregnation.

The solution 16 comprises an indicator substance responsive to the presence of a predetermined chemical condition to provide color intensities having at least an order of magnitude relationship to the magnitude of such chemical condition. The particular indicator substance being considered herein is phenolphthalein, and the solution 16 is an alcohol solution of phenolphthalein. The concentration range of the solution 16 may vary considerably, and a range of the order of from about 0.1 to about 10 percent by volume provides satisfactory results with the more restricted range of 0.1 to 1.0 per cent being preferred. The restricted range is considered advantageous because the cost of the solution is thereby reduced, and the impregnation in any case must be sufficiently low to enable subsequent impregnation with an electrolyte, as explained hereinafter. Ordinarily, the solution 16 can be maintained at about room temperature, and the web 15 is immersed therein until it is completely saturated which occurs very rapidly. The time required for impregnation of the web 15 will depend to some extent upon the porosity of the web and temperature of the solution, but typical papers have the desired penetration within about 15 to 30 seconds.

Figure 2:
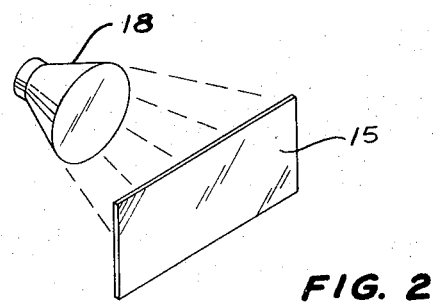
FIG. 2 is a diagrammatic view illustrating the step of drying the web after it has been impregnated with the indicator substance.

The impregnated web 15 is then removed from the solution 16 and is dried. Any usual and suitable drying technique may be employed including natural evaporation of the solution at room temperature and elevation of the temperature of the web to accelerate evaporation of the solution therefrom. The drying step is illustrated in FIG. 2 and is characterized by subjecting the web 15 to an infrared heater 18 for the purpose of elevating the temperature of the web. The rate at which the web 15 dries is in no sense critical, and it is not essential that the web be completely dry before it is subjected to subsequent steps in the preparation procedure. In any case, the rate of drying is quite rapid because of the volatility of the alcohol solution with which the web is impregnated.

Figure 3:
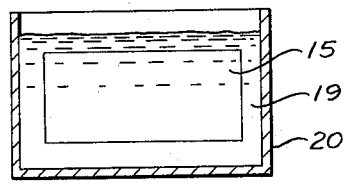
FIG. 3 is a diagrammatic view illustrating the step of impregnating the web with an electrolyte by immersing the web in a solution containing the same.

The web 15 is also adapted to be impregnated with an electrolyte effective when in an electrolyzed solution to produce the chemical condition to which the aforementioned indicator substance is responsive. Impregnation of the web 15 with the electrolyte may also be effected by a variety of procedures, and in the specific embodiment being considered the web 15 is immersed in a liquid solution of the electrolyte. In FIG. 3, the body of electrolyte solution is denoted generally with the numeral 19, and it is confined within a container 20. The impregnation procedure depicted in FIG. 3 is similar to the procedure illustrated in FIG. 1 and is, therefore, a batch-type operation. However, a continuous process can be employed as previously explained with reference to FIG. 1.

The solution 19 comprises an electrolyte effective when in an electrolyzed solution to produce the chemical condition to which the indicator substance is responsive. The particular electrolyte considered herein is sodium chloride, and the solution 19 is a water solution thereof. The concentration range of the solution 19 may vary over a wide range as, for example, from about one percent by weight to saturation. As a specific example, a saturated solution of sodium chloride in water has been found both convenient and satisfactory.

The solution 19 can be maintained at room temperature, and the web 15 is immersed therein until it is completely saturated which occurs quite rapidly. As previously explained, the time required for impregnation of the web 15 with the electrolyte solution will depend upon the porosity of the web, temperature of the solution, etc., but typical papers attained the desired penetration within about 15 to 30 seconds.

Figure 4:
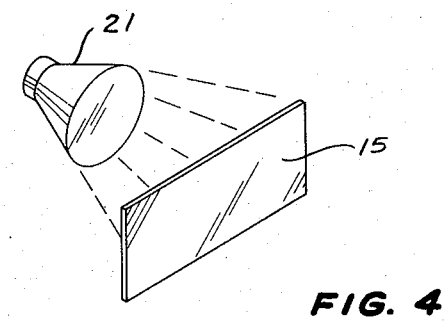
FIG. 4 is a diagrammatic view showing the step of drying the web after it has been removed from the electrolyte solution.

The impregnated web 15 is then removed from the solution 19 and is dried, as illustrated diagrammatically in FIG. 4. As previously explained, any usual and suitable drying technique may be employed, and the illustrative step shown in FIG. 4 includes subjecting the web 15 to an infrared heater 21 to elevate the temperature of the web and thereby accelerate the drying rate.

Figure 7:
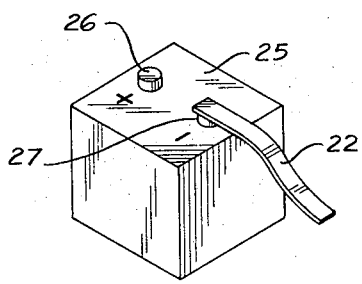
FIG. 7 is a diagrammatic perspective view showing the step of placing a portion of the test strip containing the electrolytic solution against the negative terminal of a storage battery to determine whether there is internal leakage therein.
Figure 9:
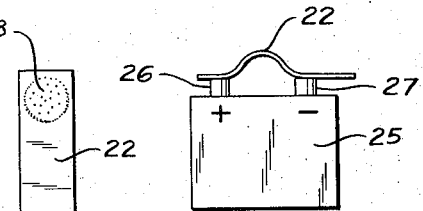
FIG. 9 is a diagrammatic side view in elevation showing the step of pressing the test strip against both the positive and negative terminals of the battery to cause a current flow therebetween through the external circuit defined by the test strip and electrolytic solution contained thereby.

After the web 15 has been dried, it is cut or otherwise subdivided into a plurality of test strips 22. Any standard cutting or severing technique may be employed to segment the web 15, and the precise size of the test strip 22 is not critical. Ordinarily, the width of each test strip should be sufficient to enable it to completely cover the terminal of any battery to be tested thereby, as shown in FIGS. 7 and 9, and the length of each test strip must be adequate to enable it to span the distance between the positive and negative terminals of any test battery, as shown in FIG. 9. The batteries most usually tested are 1½ volt flashlight batteries so that a length of about 3 to 4 inches for each test strip 22 is adequate to span the distance between the positive and negative terminals of such flashlight battery, which terminals thereof are located at the opposite ends of the battery.

Figure 5:
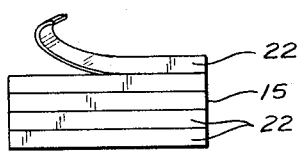
FIG. 5 is a diagrammatic view showing the step of subdividing the impregnated web into a plurality of test strips.
Figure 6:
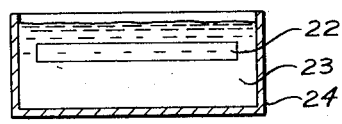
FIG. 6 is a diagrammatic view illustrating the step of wetting a test strip to produce an electrolytic solution along the test strip and comprising the electrolyte with which it was previously impregnated.

After the web-segmentation step shown in FIG. 5, the test strips 22 can be stored almost indefinitely, and they may be shipped to retail outlets and other customers where they will be used to determine the potential energy of an electric storage battery. For example, the strips 22 may be supplied by a retail store at which electric storage batteries are sold, and the employees of the store or customers thereof may test each battery prior to its acceptance by a customer so as to establish that the battery has the requisite potential energy. Prior to use, each test strip 22 must be wetted with water so as to produce an electrolytic solution along the length of the strip. The step of wetting a test strip is illustrated in FIG. 6, and it comprises immersing a strip 22 within a body of water 23 confined within a container 24. The strip 22 is quickly wetted and need only be dipped momentarily into the body of water 23 which ideally has a Ph range of from 5.0 to 7.5. After being wetted to produce the electrolyte, the test strip is ready for use.

Evaluating the operational capability of an electric storage battery may be effected on substantially any known type of battery including both wet cell and dry cell varieties. The most common type of battery with which the test strips have utility are dry cell batteries, and the battery structures depicted in FIGS. 7 and 9 may be taken to be conventional dry cell storage batteries and they are denoted with the numeral 25. The battery 25 has positive and negative terminals 26 and 27, respectively, which are disposed at one end of the battery.

Two separate tests are performed on the battery 25, the first of which determines whether an electric charge is present at the negative terminal of the battery (the test shown in FIG. 7), and if a charge is present thereat the battery is at least partially defective in the sense that it will not have the complete potential energy expected thereof; and the second of which establishes the magnitude of the potential energy then provided by the battery (the test illustrated in FIG. 9). The results of each of these tests are ascertained by observing the test strip 22 immediately following each particular test. If the battery 22 has a charge at its negative terminal 27, the test strip 22 will have a visual indication thereof, as shown at 28 in FIG. 8. Following the rating test depicted in FIG. 9, the test strip 22 will have visual indicia 29 thereon, unless the battery is completely discharged. In each instance, the indicia 28 and 29 provides a color impression (red in the case of phenolphthalein), and the intensity of the indicia is an index of the concentration of the basic solution formed at the negative terminal of the battery and therefore of the charge thereat. For purposes hereof, the term "color intensity" may be taken to be the extent of the total area discolored rather than the shade or depth of the color which may be the same in all cases, and this distinction is evidenced by the areas 28 and 29, the first of which has a smaller total area or color density than the second.

Respecting the first test (FIGS. 7 and 8), a battery 25 having no external load connected across the terminals 26 and 27 thereof should not be discharging so that no charge should be present at the terminals. If the battery 25 does have a charge at the terminals 26 and 27 thereof with no external load thereacross, the battery is defective because it is discharging and as a consequence the internal resistance thereof is continuously increasing. Any such increase in internal resistance shortens the life expectancy of the battery because it will become non-operational whereever the sum of the internal resistance and external load resistance reduces the current flow through the load to a value less than that necessary to accommodate load requirements. The relationship involving circuit resistance, current flow, and energy is known as Ohm's Law and is defined by the formula:

$I = E/R$ where I is the current flow in amperes, E is the energy in volts, and R is the resistance in ohms.

Whether the battery 25 is discharging with no external load connected across the terminals 26 and 27 thereof is determined by placing a portion of the test strip 22 in firm engagement with the negative terminal 27 and, after a short time (e.g., one minute), removing the strip and observing whether a discoloration is present throughout the area of the strip previously in contact with the terminal. If no discoloration exists, there is very little or no discharge of the battery, and it should not be defective because of a continuously increasing internal resistance. However, if a discoloration is present along the strip 22, such as the area 28 shown in FIG. 8, the battery is defective and the intensity of the discoloration will provide a guide as to the extent of the defect. That is to say, if the discoloration is minimal, it indicates that the charge at the terminal 27 is of relatively low value whereas a very intense color indication suggests the presence of a relatively large charge at the terminal and a relatively high discharge rate.

Figure 10:
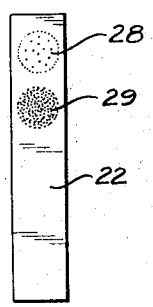
FIG. 10 is a face view in elevation showing the test strip following the step illustrated in FIG. 9.

The second test (FIGS. 9 and 10) constitutes placing a conductive load across the terminals 26 and 27 of the battery by pressing areas of the test strip 22 against such terminals to cause a current flow therebetween through the electrolytic solution carried by the test strip and comprising the water and sodium chloride admixture. Such current flow causes a charge to be present at each of the terminals 26 and 27, and the magnitude of the charge is proportional to the magnitude of the current flow and, therefore, proportional to the potential energy of the battery 25 in accordance with the aforementioned Ohm's Law relationships. If the color intensity of the indicator area 29 is relatively great, the battery 25 can be expected to have a high potential energy and is therefore a good battery of acceptable quality. On the other hand, if the color intensity of the area 29 is relatively small, the potential energy of the battery 25 is slow and it can be considered to be at least partially discharged and defective. In FIG. 10, the strip 22 has two indicator areas 28 and 29 thereon, the first of which establishes that the battery 25 has an internal leakage and is continuously discharging, and the second of which provides an index of the contemporary value of the potential energy of the battery by the intensity of the color thereof.

Each of the tests performed on the battery 25 is of electrochemical origin and is concerned with the presence or absence of certain ion charges at the negative terminal 27 of the battery 25. The test strip 22 and test results indicated thereby pertain only to the charges at the negative terminal 27 of the battery and do not pertain to the positive terminal 26. As respects the second test in which the strip 22 defines an external load across the terminals of the battery 25, the test is based upon electrolysis of the electrolytic solution comprising the sodium chloride electrolyte and water admixed therewith.

In this reference, sodium chloride in solution with water exists as positively charged sodium ions and negatively charged chlorine ions. The water itself contains only a small number of positively charged hydrogen ions and negatively charged hydroxyl ions. When the test strip 22 is placed across the positive and negative terminals 26 and 27, the potential energy or voltage defined between these two terminals causes the hydrogen and sodium ions to migrate to the negative terminal 27. Some of these positive ions are discharged and converted into free elements by removing from and combining with electrons present at the negative terminal 27. The hydrogen ions, by virtue of their chemical reactivity, have a stronger attraction for the electrons than do the sodium ions. Therefore, as the hydrogen ions at the negative terminal are removed from the solution, more molecules of water are caused to disassociate, thereby leading to a greater concentration of hydroxyl ions in the vicinity of the negative terminal 27 which remain unchanged and provide a solution of sodium hydroxide.

Sodium hydroxide is a base and causes the phenolphthalein indicator to turn red, and the intensity of its color or extent to which it turns red is in proportion to the amount or concentration of the sodium hydroxide formation and, therefore, to the potential energy or voltage charge of the battery 25. Thus, the electrolyte with which the web 15 was impregnated is effective when in an electrolyzed solution to produce a chemcial condition (namely, the presence of a basic solution at the negative terminal of the battery) to which the indicator substance with which the web is also impregnated is responsive.

Figure 8:
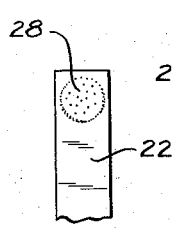
FIG. 8 is a broken face view in elevation of the end portion of the test strip after removal thereof from the negative terminal of the battery to see whether the battery is defective because of internal leakage, the test strip shown in FIG. 8 depicting the results of a defective battery.

As respects the first test illustrated in FIGS. 7 and 8, the function is essentially the same with any electron charge present at the negative terminal 27 of the battery as a consequence of internal current leakage causing the development of a sodium hydroxide solution to be formed at the area of the test strip in engagement with the contact, and which basic solution is then sensed by the indicator substance with which the test strip is impregnated, as previously explained. As in the case of the rating test shown in FIGS. 9 and 10, the color intensity of the indicator area 28 provides an index of the magnitude of the charge present at the terminal 27 and, therefore, a measure of the extent to which the battery has an undesirable internal current flow.

Figure 11:
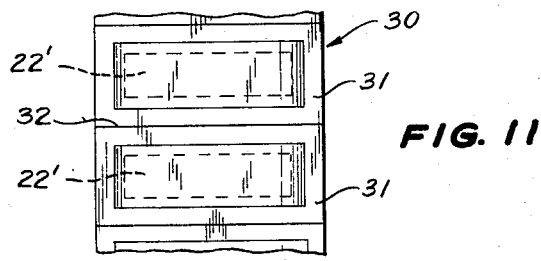
FIG. 11 is a broken top plan view illustrating a package constituting a plurality of packets each equipped with a wetted test strip immediately ready for use (i.e., the step shown in FIG. 6 having already been performed).

As previously explained, the test strips 22 can be stored and transported in a dry condition in which case they must be moistened with water prior to use, as illustrated in FIG. 6. Alternatively, the test strips 22 can be packaged, shipped, and stored in a wet state ready for immediate use, thereby obviating the requirement for one or the other or both of the steps respectively shown in FIGS. 4 and 6. That is to say, the dried test strips 22, as shown in FIG. 5, may be wetted and then packaged, or the web 15 after being removed from the solution 19 (see FIG. 3) could be segmented into test strips which are then packages. In the latter instance, both the drying step shown in FIG. 4 and subsequent wetting step illustrated in FIG. 6 are obviated. A typical package 30 is illustrated in FIG. 11 and it comprises a plurality of individual packets 31 respectively equipped with wetted test strips 22'. The packets are adapted to be separated one from another along lines of weakness 32 interconnecting the same, and each packet is moisture proof so as to prevent escape of moisture from the test strips encapsulated therewithin. The test strips 22' may be folded upon themselves so as to reduce the width of the package 30 which will not appreciably increase the thickness thereof.

As a convenience to one using the indicator strips, a chart can be provided to permit comparison of any test result with a standard or reference, thereby increasing the accuracy of the determination made respecting the operational capability of the battery tested. Although a convenience, such as charts are not essential.

While in the foregoing specification embodiments of the invention have been set forth in considerable detail for purposes of making a complete disclosure thereof, it will be apparent to those skilled in the art that numerous changes may be made in such details without departing from the spirit and principles of the invention.

What is claimed is:

1. In a method of testing an electric storage battery to determine if it has internal leakage, the steps of: providing a test strip impregnated with an indicator substance responsive to the presence of a predetermined chemical condition to provide visual indicia thereof, and also impregnated with an electrolytic solution effective when electrolyzed in the presence of an electron charge to produce such chemical condition; and pressing said strip into firm engagement with only one terminal of a battery to determine whether such electron charge is present thereat effective to electrolyze the solution to produce such chemical condition, whereby subsequent observation of said test strip will evidence the presence or absence of such chemical condition and the presence or absence of internal leakage.

2. The method of claim 1 in which said test strip is pressed into engagement with the negative terminal of the battery.

3. The method of claim 1 in which said indicator substance is phenolphthalein and the electrolytic solution constitutes a water solution of sodium chloride, and in which said test strip is pressed into engagement with the negative terminal of the battery.

* * * * *